United States Patent
Fullea Carrera et al.

(10) Patent No.: US 8,885,010 B2
(45) Date of Patent: Nov. 11, 2014

(54) MULTIPOINT CONFERENCE METHOD THAT DOES NOT USE A SERVER

(75) Inventors: Eduardo Fullea Carrera, Madrid (ES); Rafael Morón Abad, Valladolid (ES)

(73) Assignee: Telefonica, S.A., Madrid (ES)

( * ) Notice: Subject to any disclaimer, the term of this patent is extended or adjusted under 35 U.S.C. 154(b) by 249 days.

(21) Appl. No.: 13/582,270

(22) PCT Filed: Mar. 4, 2010

(86) PCT No.: PCT/ES2010/070117
§ 371 (c)(1),
(2), (4) Date: Oct. 22, 2012

(87) PCT Pub. No.: WO2011/107624
PCT Pub. Date: Sep. 9, 2011

(65) Prior Publication Data
US 2013/0033563 A1 Feb. 7, 2013

(51) Int. Cl.
*H04N 7/14* (2006.01)
*H04L 12/18* (2006.01)
*H04L 29/06* (2006.01)

(52) U.S. Cl.
CPC ........ *H04L 12/1822* (2013.01); *H04L 65/4053* (2013.01); *H04L 12/1863* (2013.01); *H04L 65/1016* (2013.01)
USPC .................... 348/14.02; 348/14.08; 348/14.09

(58) Field of Classification Search
USPC .................................. 348/14.02, 14.08, 14.09
See application file for complete search history.

(56) References Cited

U.S. PATENT DOCUMENTS

| | | | |
|---|---|---|---|
| 6,288,739 B1* | 9/2001 | Hales et al. | 348/14.07 |
| 7,257,641 B1* | 8/2007 | VanBuskirk et al. | 709/238 |
| 8,351,586 B2* | 1/2013 | Ali-Vehmas | 379/202.01 |
| 2002/0009990 A1* | 1/2002 | Kleier et al. | 455/416 |
| 2002/0131565 A1* | 9/2002 | Scheuring et al. | 379/88.19 |
| 2003/0119540 A1* | 6/2003 | Mathis | 455/518 |
| 2004/0203977 A1* | 10/2004 | Kennedy | 455/518 |
| 2005/0032475 A1* | 2/2005 | Mauney et al. | 455/41.2 |
| 2007/0005804 A1* | 1/2007 | Rideout | 709/246 |

OTHER PUBLICATIONS

International Search Report dated Dec. 21, 2010 issued in corresponding international patent application No. PCT/ES2010/070117.
K. Doolin et al. "Supporting ubiquitous IMS-based teleconferencing through discovery and composition of IMS and web components", *Journal of Network and Systems Management*, 16(1):92-112.
D. Bijwaard et al., "The Daidalos project and standardizing NGN in ETSI TISPAN—an overview", pp. 1-17 (2005).

* cited by examiner

*Primary Examiner* — Joseph J Nguyen
(74) *Attorney, Agent, or Firm* — Ostrolenk Faber LLP

(57) ABSTRACT

Disclosed are different terminals involved in a conference and arranged in a tree topology. Each terminal stores a list of participating terminals, the types of media streams of each terminal, and a media diagram referring to the processing actions of the terminals, in order to allow the conference to be conducted without a server and in a self-organized manner, providing fault tolerance such that the conference as a whole can overcome the failure of any of the participating terminals, allowing the conference to be reconfigured when a user leaves the same, either because it ceases to respond owing to a problem in the terminal or because the user so desires.

8 Claims, 5 Drawing Sheets

MULTIPOINT CONFERENCE METHOD THAT DOES NOT USE A SERVER

CROSS-REFERENCE TO RELATED APPLICATIONS

The present application is a 35 U.S.C. §371 national phase application of PCT/ES2010/070117, filed Mar. 4, 2010, and published as WO 2011/107624, the content of which is incorporated in full by reference herein.

OBJECT OF THE INVENTION

As expressed in the title of this specification, the present invention relates to a multipoint conference method in which a server is not used in the communication between the terminals involved, and the object of which is to provide a self-organized and fault-tolerant conference, such that if one of the terminals involved in the conference fails, the remaining terminals can continue the conference since it can be reorganized.

The invention is applicable in conferences in which there is an exchange of audio and/or video signals between the participating terminals.

BACKGROUND OF THE INVENTION

Audio and video conferences between more than two participants are becoming more important today as they are increasingly more common.

In this sense, it is very common in the state of the art to add a type of server to assist either with the organization and synchronization of the parties involved or with the mixing of the media streams, media being understood as the data associated with the exchange of audio and video signals between the participating terminals.

The use of a single server handling the conference between terminals by means of a star configuration is known in the state of the art.

Multiple distributed servers cooperating with one another are used in other cases such that it is necessary for servers to handle part of the synchronization and the characteristics of mixing media supporting the conference, like in the case of using a single server.

In any of the cases in which one or more servers is used, there are cases in which the participating terminals are well communicated with one another by means of a low-congestion network, but it may not be capable of accessing an external conference server. Even if the external conference server can be accessed, the connectivity with same may not be good enough, and in any case worse than that existing between them, especially if the participating terminals are arranged on a local area network.

Therefore the centralized proposal where a server takes care of the functionalities of synchronizing or mixing the media streams is not always the best method. The same occurs for the case in which several conference servers cooperate and control the exchange and/or information of the media.

The multipoint conference without using a server is possible, as described for example in patent document U.S. 2007/0005804A1, which teaches several ways to take advantage of transmitting to multiple destinations in a multipoint conference without server, in which when a user decides to set up an audio/video conference with a group of users, he/she sends a petition to all the terminals, such that the users have the option to accept or reject it. When they accept the petition, they join the conference in which the media stream is distributed by multicast technologies, unlike the present invention in which transmission to multiple destinations (multicast) is not used to distribute the media streams but rather they are distributed to a single destination, as will be described below.

In this case the mentioned proposal without server represents a solution that is not easily applicable to a telephony network because it is based on client-to-client protocols. In this case it is necessary to reuse existing protocols provided it is possible. Networks of this kind further set up communications based on sessions consisting of streams, such that the client-to-client proposal is not directly applicable thereto. A new solution that is based on the same concept of multimedia sessions supported by telephony networks is therefore needed.

Patent document EP 1696630 describing a solution for a serverless multipoint conference between communication nodes by means of a client-to-client network should also be mentioned. The media frames are shared between terminals according to their processing capacities to mix and distribute them.

In this case the serverless multi-party, real-time audio communication uses a client-to-client protocol which does not present interoperability with standardized systems or communication systems capable of functioning in an IMS (IP Multimedia Subsystem) network in which the communication is client-to-client, such that it cannot be integrated with standardized telephony systems without important actions or extensions. This determines a serious limitation, taking into account the increase in telephony solutions arising today.

DESCRIPTION OF THE INVENTION

To achieve the objectives and solve the aforementioned drawbacks, the invention has developed a new multipoint conference method that does not use a server and that is adapted to the telephony solutions existing today.

The invention requires the involvement of at least a first user terminal, a second user terminal and a third user terminal between which the multipoint conference is set up, and is characterized in that it comprises storing in the first terminal, second terminal and third terminal a list of the participating terminals, the types of media streams available in each terminal and the media diagram referring to the processing actions of said terminals; media being understood as the data associated with the exchange of audio and video signals between terminals.

It then follows a step consisting of the first terminal taking the media streams of the second terminal and its own media stream input provided by said first terminal. The first terminal then generates a mixed audio and video stream containing the media streams of the first and second terminal, and the generated media stream is sent to the third terminal.

Next the first terminal takes the media streams of the third terminal and its own media stream input of said first terminal.

The first terminal then generates a mixed audio and video stream containing the media streams of the first and third terminal, and the media stream generated in the preceding step is sent to the second terminal.

The described method has the enormous advantage of allowing multipoint conferences to be conducted on telephony networks where the synchronization between the participating terminals and the mixing of media streams are performed by the participating terminals themselves without the need for servers to perform these specific tasks.

For the case in which a plurality of terminals is involved in the multipoint conference, the method comprises arranging the different terminals in a tree topology, and a list of the participating terminals, the types of media streams of each terminal and the media diagram referring to the processing actions of said terminals are then stored in each of the terminals. The first terminal then takes the media streams in all the neighboring terminals except that of one of said neighboring terminals, together with its own media stream input. Next the first terminal generates a mixed audio and video stream containing the media streams of the first terminal and of all the neighbors except that of the neighboring terminal from which the media streams are not taken, and the media stream generated in the preceding step is sent to the only neighboring terminal the media streams of which are not taken.

The phases of taking, generating and sending media streams are repeated with each group of neighboring terminals forming part of the tree topology, so that all the terminals receive the media streams of all the terminals participating in the conference.

By means of the information stored in the different participating terminals referring to the list of the participating terminals, the types of media streams of each terminal and the media diagram, the terminals are able to understand which operations are taking place and what the media processing diagram is, i.e., each terminal knows how to process the media of its neighboring terminals and further knows the remaining participants involved in the multipoint conference, even though they are not neighboring terminals, because they could become a neighboring terminal if a terminal leaves the conference or experiences a type of failure, as will be described below.

The list of the participating terminals which are involved in the conference includes at least one identifier (URI) for each of the terminals, as well as the types of media streams, audio streams, video streams or streams specific to the application that each of the terminals is handling.

Furthermore, the processing actions—multiplexing, mixing—which need to be done in each of the terminals, as well as the specific participants who are taking care of each of them are described by means of the media diagram.

A carrier protocol is needed to exchange information between terminals, and it can be any protocol capable of the aforementioned sending between terminals of the conference.

The invention allows setting up the conference between a first terminal, a second terminal and a third terminal by means of a direct request from the first terminal to the second terminal such that a point-to-point conference is set up between both and then a the second terminal makes a direct request to the third terminal to join the conference.

To that end, the phase of setting up a conference between the first terminal, second terminal and third terminal comprises a step in which a direct request is issued by means of the first terminal issuing an invitation to the second terminal to set up a conference between both. The second terminal accepts the invitation and sends an invitation acceptance message as a response, for the second terminal and the first terminal to then exchange the media streams included in the conference.

The second terminal then generates an invitation to the third terminal at a certain moment in time to add it as a new participant to the communication session, in which the invitation contains the list of participating terminals, the types of media streams of each of said participating terminals and the media diagram. The third terminal then replies with an invitation acceptance message when said third terminal is capable of handling the invitation and the user accepts it.

Next the second terminal and third terminal exchange the media streams involved in the conference such that the second terminal disseminates the media streams resulting from the combination of the media transmitted by the first terminal and the media provided by the second terminal to the third terminal.

The media streams are then reconfigured by means of the replacement in the second terminal of the media which are being transmitted to the first terminal with a combination of the streams provided by the second terminal and the media stream input provided by the third terminal. Then the second terminal sends a notification to the first terminal in which it includes the list of participating terminals, the types of media streams of each terminal and the media diagram. The first terminal replies with an acceptance notification when the protocol used supports it, and the first terminal detects the current status of the conference, so that if the second terminal experiences problems to communicate, the third terminal and the first terminal have the information necessary for reconfiguring the conference without the second terminal.

The conference between the first terminal, second terminal and third terminal can also be set up by means of a direct request from the first terminal to the second terminal such that a point-to-point session is set up between both and the third terminal is subsequently added to the conference by means of a indirect request from the first terminal to the second terminal. To that end the method of the invention comprises a step in which the first terminal issues an invitation to the second terminal to set up a conference between both, and the second terminal accepts the invitation and sends an invitation acceptance message as a response to the first terminal.

The media streams included in the conference are then exchanged between the first and second terminal, and the first terminal requests the second terminal to add a third terminal to the conference at a certain moment in time. The second terminal sends a request acceptance response to the first terminal when it is capable of handling a new session with the third terminal, and the second terminal issues an invitation to the third terminal containing the list of participants, the types of media streams of each terminal and the media diagram.

The third terminal then replies with an invitation acceptance notification when the new terminal is capable of handling the invitation and its user accepts it.

Next the second terminal and the third terminal exchange the media streams involved in the conference, such that the second terminal disseminates to the third terminal the media streams resulting from the combination of the media transmitted by the first terminal and the media streams provided by the second terminal.

The media streams are then reconfigured by means of the replacement in the second terminal of the media streams which are being transmitted to the first terminal with a combination of the media streams provided by the third terminal and the media stream input provided by the second terminal.

Finally, the second terminal sends a notification to the first terminal including the list of participants, the types of media streams of each terminal and the media diagram, such that the first terminal replies with an acceptance of the notification, if the underlying protocol supports it, and the first terminal detects the current status of the conference, so that if the second terminal experiences problems to communicate, the first terminal and the third terminal have the information necessary for reconfiguring the conference without the second terminal.

Therefore, the invention has the enormous advantage of providing fault tolerance because the multipoint conference can continue as all the terminals know the information necessary for being able to reorganize if a terminal leaves the conference.

Once a conference is set up between a first terminal, a second terminal and a third terminal, regardless of whether the session has been set up by means of direct or indirect invitation, the invention envisages the possibility of adding a new participant to the conference, it being for example the third terminal that adds it, at a certain moment in time, so the method comprises a step in which the third terminal issues an invitation to a fourth additional terminal including the list of the participating terminals, the types of media streams of each terminal, and the media diagram. The fourth additional terminal accepts the invitation and sends an invitation acceptance message as a response to the third terminal. The fourth additional terminal then sends its media streams to the third terminal, in which they are received, and the latter combines the media streams received from the fourth additional terminal with its own media stream input and forwards them to the second terminal. The second terminal further sends the combined streams to the first terminal and to the remaining neighboring terminals, such that said third terminal then combines the media streams received from the second terminal with its own media stream input and forwards them to the fourth additional terminal. The third terminal, as the terminal responsible for involving the additional terminal, then informs the remaining terminals participating in the conference of the reconfiguration experienced by the conference, sending the list of participating terminals, the types of media streams of each terminal and the media diagram.

In another embodiment of the invention, an additional terminal can also be added to the conference by means of an indirect request, such that for example the first terminal adds a fourth additional terminal to the conference by means of an indirect request to the third terminal. To that end the method of the invention comprises the first terminal requesting the third terminal to add a fourth additional terminal to the conference at a certain moment in time such that the third terminal then sends a request acceptance response to the first terminal when said third terminal is capable of handling a new session with the fourth additional terminal. The third terminal then issues an invitation to the new terminal, including the list of participating terminals, the types of media streams of each terminal and the media diagram, to which the additional terminal replies with an invitation acceptance notification when it is capable of handling the invitation and its user accepts it.

The fourth additional terminal then sends its media streams to the third terminal in which they are received and it combines the media streams received from the fourth additional terminal with its own media stream input and forwards them to the second terminal.

The second terminal then sends the combined streams to the first terminal and to the remaining neighboring terminals.

Next the third terminal combines the media streams received from the second terminal with its own media stream input and forwards them to the fourth additional terminal.

Finally, the third terminal, as the terminal responsible for involving the additional terminal, informs the remaining terminals participating in the conference of the reconfiguration experienced by the conference, sending the list of participants, the types of media streams of each terminal and the media diagram.

The invention further envisages that in a multipoint conference set up one of the terminals can leave the conference either by means of issuing a request to leave or because it experiences a problem or malfunction.

In this case the method is described for the case where there is a multipoint conference set up between a first terminal, a second terminal, a third terminal and a fourth terminal, and it is the third terminal which leaves the conference.

In this case if it is the user leaving the conference on his/her own impulse, the third terminal issues a petition to break up the conference to the second terminal and fourth terminal, which reconfigure the conference and exchange the media streams of the conference. The second terminal and fourth terminal then send an acceptance of the petition to break up to the third terminal which leaves the conference. Next the transmission and receipt of media streams between the second terminal and the third terminal and between the fourth terminal and the third terminal is stopped, and said second terminal and fourth terminal send a notification including the new media diagram to the remaining terminals participating in the conference which are not involved in the process of leaving.

In the case where the third terminal leaves the conference owing to a failure therein, the method comprises a step in which the third terminal ceases to respond to the second and fourth terminal for a specific time, whereby said terminals do not receive the streams from said third terminal. Then either the second terminal or the fourth terminal detects the inactivity in one of the streams and issues an invitation to the other terminal affected by the failure, i.e., if the second terminal is the one that detects the absence of media streams, it issues the invitation to the fourth terminal. This invitation is received in the other terminal, i.e., in the fourth terminal in the case described, and it accepts the invitation received, new media streams being created in the second terminal and fourth terminal according to the streams that they were exchanging with the third terminal. The second terminal and fourth terminal then send a petition to break up to the third terminal, and when they do not receive a response to the petition to break up within a certain pre-established time, they identify it as an acceptance to break up, and next the terminal issuing the invitation, in this case the second terminal, notifies the remaining terminals participating in the conference of the new distribution of the media streams by sending a notification including the new media diagram.

The steps indicated above in which the list of participating terminals, the types of media streams of each terminal, and the media diagram is sent is done by means of sending enclosed data or by means of sending a reference to the enclosed data.

Therefore, by means of the invention if one of the terminals involved in the conference fails, regardless of which one it is, the conference can continue because all the participants can be reorganized; furthermore, the implementation of the method of the invention does not require expensive hardware in the network because the functionality of the multipoint conference is delegated in the participating terminals.

To help better understand this specification and forming an integral part thereof, a series of drawings is attached below in which the object of the invention has been depicted with an illustrative and non-limiting character.

DESCRIPTION OF THE PREFERRED EMBODIMENT

Figure 1:
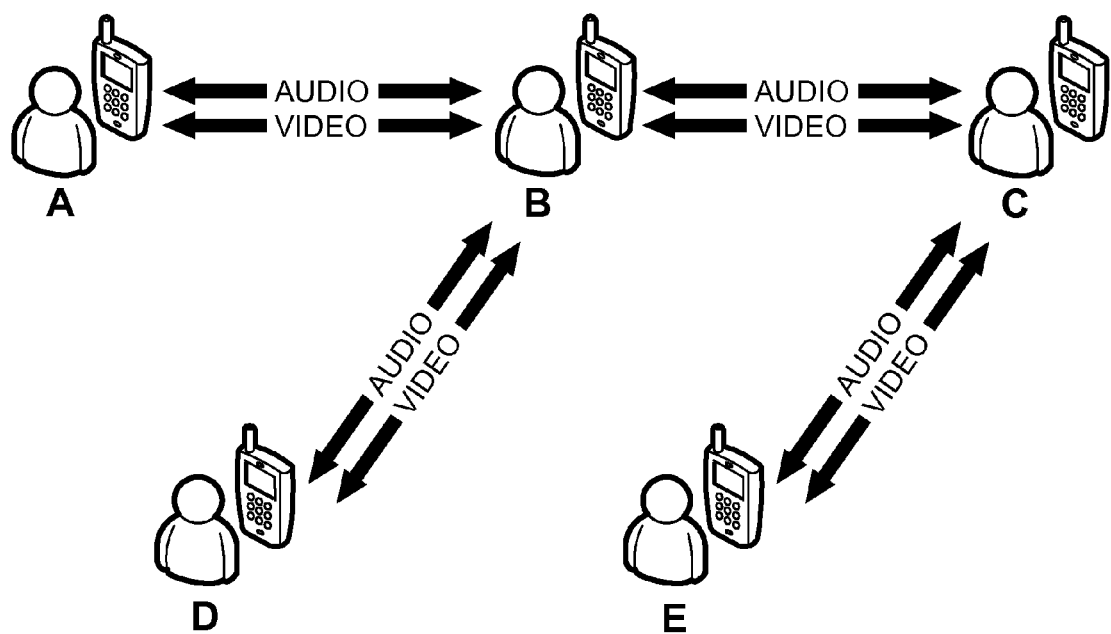
FIG. 1 shows a possible embodiment of the method of the invention in which a plurality of terminals is involved in a multipoint conference.

A description of the invention is provided below based on the figures described above.

The embodiment of the invention is described for the case where a first terminal A, a second terminal B, a third terminal C, a fourth terminal D, and a fifth terminal E are involved in a multipoint conference.

The method of the invention determines that terminals A-E organize themselves to provide the functionalities of mixing and synchronizing media streams.

To that end the different terminals A-E are arranged in a tree topology, and each terminal stores a list of the participating terminals A-E, the types of media of each terminal and the media stream diagram referring to the processing actions of said terminals.

The second terminal B takes the media streams of the first terminal A and fourth terminal D, together with its own media stream input, and generates a mixed audio and video stream containing the media streams of the first terminal, second terminal and fourth terminal, and sends it to the third terminal. It also takes the media streams of the second terminal and fourth terminal, mixes them with its own media streams and then sends them to the first terminal. Similarly, it takes the media streams of the first terminal and third terminal, mixes them with its own media streams and sends them to the fourth terminal D.

From the viewpoint of the third terminal, the latter provides media streams to the fifth terminal E based on those received from the second terminal, adding its own media stream inputs. The second terminal also receives the streams from the fifth terminal E combined with the input of the third terminal. Accordingly, the first terminal A takes the media streams of all the neighboring terminals except that of one of said neighboring terminals, together with its own media stream input, for the first terminal A to then generate a mixed audio and video stream containing the media streams of the first terminal A and of all the neighbors except that of the neighboring terminal from which the media streams are not taken and sends the media stream generated in the preceding step to the only neighboring terminal the media streams of which were not taken. The phases of taking, generating and sending media streams are repeated with each group of neighboring terminals forming part of the tree topology so that all the terminals receive the media streams of all the terminals participating in the conference.

The conference between terminals can be set up by means of a direct request between the terminals, or by means of an indirect request.

Therefore, a conference can be set up between a first terminal A, a second terminal B and a third terminal C, for example, by means of a direct request from the first terminal A to the second terminal B, such that a point-to-point session is set up between both and the third terminal is then added to the conference by means of a direct request from the second terminal to the third terminal. The request consists of an invitation to join the conference.

Figure 2:
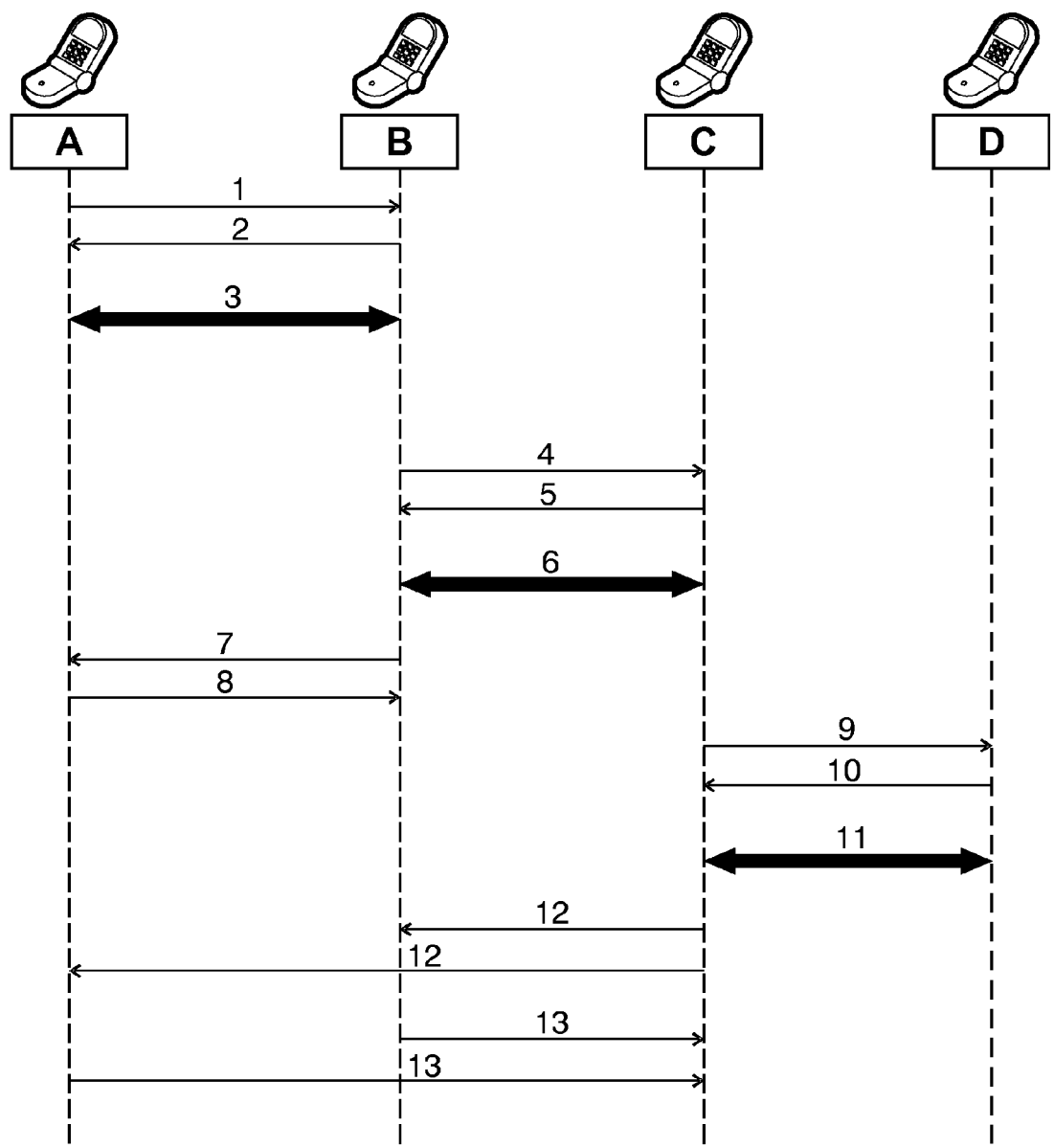
FIG. 2 shows a possible embodiment in which in the multipoint conference is set up with direct invitations.

The process of setting up the conference by means of a direct request is described with the aid of FIG. 2 and comprises the following steps:

The user of the first terminal A issues an invitation 1 to the second terminal B to set up a conference by means of his/her terminal. This is a standard one-to-one invitation.

The user of the second terminal B accepts the invitation and sends an invitation acceptance message 2 as a response.

The first terminal A and the second terminal B begin to exchange media streams 3 included in the conference.

At a certain moment in time, upon indication of the user the second terminal B generates an invitation 4 to the third terminal C to add it as a new participant to the communication session. This invitation contains the list of participants, the types of media streams of each terminal and the media diagram either as enclosed data or by including a reference thereof.

If the third terminal C is capable of handling the invitation and its user accepts it, said third terminal C replies with an invitation acceptance message 5.

The second terminal B and third terminal C then exchange the media streams 6 involved in the conference, such that the second terminal B disseminates to the third terminal C the media streams resulting from the combination of the media streams transmitted by the first terminal A and the media streams provided by the second terminal B. The technique used to mix the media streams, including which pieces of the original streams are included in the resulting stream, are not part of the invention and will depend on the implementation of the method of the invention.

The second terminal B then reconfigures the media streams by means of the replacement of the media which are being transmitted to the first terminal A with a combination of the media streams provided by the third terminal C and the media stream input provided by the second terminal B.

The second terminal B then sends a notification 7 to the first terminal A including the list of participants, the types of media streams of each terminal and the media diagram.

The first terminal A replies with an acknowledgement of receipt of the notification 8.

The first terminal A detects the current status of the conference and therefore if the second terminal B experiences problems to communicate, both terminals corresponding to the first terminal A and the third terminal C store the information necessary for reconfiguring the conference without the intervention of the second terminal B.

At this point it is possible to add a new participant to the conference, for example by means of the third terminal C, for which purpose it issues an invitation 9 to a fourth terminal D, which corresponds to an additional terminal, such that said invitation includes the list of participants, the types of media streams of each terminal and the media diagram.

The additional terminal D accepts the invitation and sends an invitation acceptance message 10 as a response to the third terminal C.

An exchange of media streams 11 between the third terminal C and the additional terminal D then begins, such that the additional terminal D sends its media streams to the third terminal C in which they are received such that the latter combines the media streams received from the additional terminal D with its own media stream input and forwards them to the second terminal B by means of the exchange of media streams 6 set up between the second terminal and third terminal.

Said second terminal B sends the combined streams to the first terminal A by means of the exchange of media streams 3 and to the third terminal C by means of said exchange of media streams 6.

The third terminal C combines the media streams received from the second terminal B with its own media stream input and forwards them to the additional terminal D by means of the exchange of media streams 11.

Next the third terminal C, as the terminal responsible for involving the additional terminal D, informs 12 the remaining participants in the conference corresponding to the second terminal B and first terminal A, which respond 13 with an acknowledgement of receipt of the notification.

To set up a conference by means of an indirect request, in a session between a first terminal A, a second terminal B and a third terminal C, firstly a direct request is made from the first terminal A to the second terminal B, such that a conventional point-to-point session is set up between both and said first terminal A subsequently adds the third terminal C to the conference by means of an indirect request from said first terminal A to the third terminal C.

Figure 3:
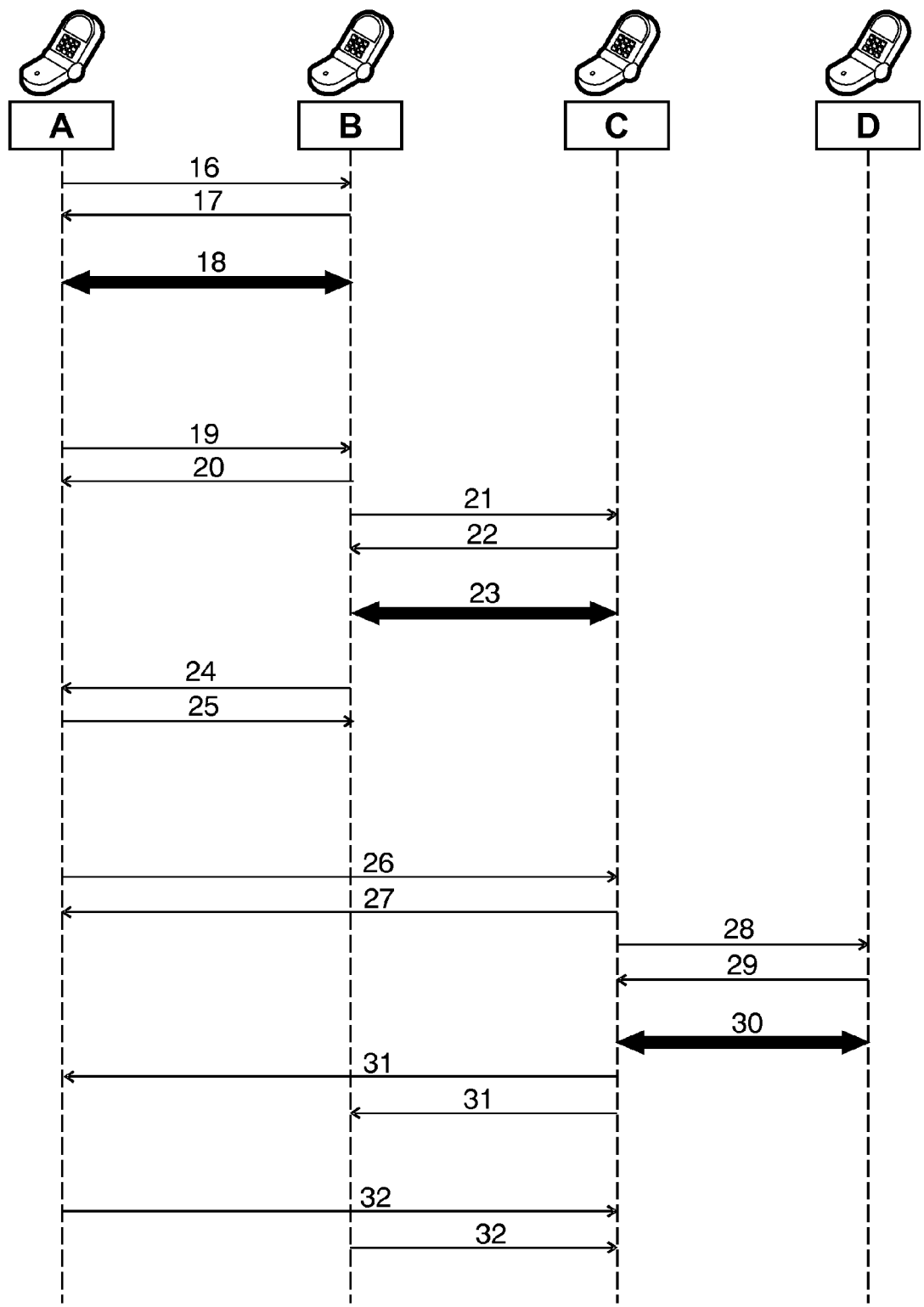
FIG. 3 shows a possible embodiment in which the multipoint conference is set up by means of indirect invitations.

This process is described with the aid of FIG. 3 and comprises the following steps:

The user of the first terminal issues an invitation 16 to the second terminal B to set up a conference by means of his/her first terminal A. This is a standard one-to-one invitation, as discussed.

The user of the second terminal B accepts the invitation through his/her second terminal B and sends an invitation acceptance message 17 as a response.

The first terminal A and the second terminal B then exchange the media streams 18 included in the conference.

At a certain moment in time, the user of the first terminal requests 19 the second terminal to add a third terminal to the conference.

The second terminal B then generates a request acceptance response 20 to the first terminal A when said second terminal is capable of handling a new session with the third terminal C.

The second terminal B in turn issues an invitation 21 to the third terminal C containing the list of participants, the types of media of each terminal and the media diagram either as enclosed data or by including a reference thereof.

If the third terminal C is capable of handling the invitation and the user accepts it, said third terminal C replies with an invitation acceptance message 22.

The second terminal B and the third terminal C then begin to exchange media streams 23 resulting from the combination of the media streams transmitted by the first terminal A and the media streams provided by the second terminal B. Also in this case, the method used to mix the media stream it includes and which pieces of the original streams are included in the resulting stream are outside the scope of the present invention and depend on the implementation thereof.

The second terminal reconfigures the media streams by means of the replacement in said second terminal B of the media which are being transmitted to the first terminal A with a combination of the streams provided by the third terminal C and the media stream input provided by the second terminal B.

The second terminal B then sends a notification 24 to the first terminal A including the list of participants, the type of media streams of each terminal, and the media diagram either as enclosed data or by including a reference thereof.

The first terminal A replies with an acknowledgement of receipt of the notification 25.

In this condition, the first terminal knows the current status of the conference such that if the second terminal experiences problems to communicate, the first terminal and third terminal store the information necessary for reconfiguring the conference without the second terminal B.

Both in the case where the multipoint conference set up between a first terminal A, a second terminal B and a third terminal C is done by means of a direct request or an indirect request, it is possible to add a fourth terminal or additional terminal D to the conference, for which purpose in this case the first terminal indicates to the third terminal to add the additional terminal D to the conference by means of an indirect request to the third terminal, for which purpose this method comprises the following steps:

At a certain moment in time the first terminal A requests 26 the third terminal C to add an additional terminal D to the conference.

The third terminal C generates a request acceptance response 27 to the first terminal A, provided that said third terminal C is capable of handling a new session with the additional terminal D.

The third terminal C issues an invitation 28 to the additional terminal D including the list of participants, the types of media streams of each terminal, or a reference thereof.

Next the additional terminal D generates an invitation acceptance notification 29 when it is capable of handling the invitation and its user accepts it.

The exchange of media streams 30 between the third terminal C and the additional terminal D then begins, such that the additional terminal D sends its media streams to the third terminal C and receives the mixed streams from the additional terminal D.

The third terminal C combines the media streams received from the additional terminal D with its own media stream input and forwards them to the second terminal B by means of the exchange of media streams 23 set up between the third terminal C and the second terminal B.

The second terminal B sends the combined streams to the first terminal A by means of the exchange of media streams 18 and to the third terminal C by means of the exchange of media streams 23.

The third terminal C in turn combines the media streams received from the second terminal B with its own media stream input and forwards them to the additional terminal D by means of the exchange of media streams 30.

Finally, the third terminal C, as the terminal responsible for involving the additional terminal D, informs 31 the remaining terminals, i.e., the first terminal A and the second terminal B, of the reconfiguration experienced by the conference, sending the list of participants, the types of media streams of each terminal and the media diagram either as enclosed data or by making reference thereto. Said terminals A and B in turn respond 32 to the third terminal C with an acknowledgement of receipt of the notification.

Once the multipoint conference has been set up, one of the participating terminals could eventually leave the conference, even though it must indicate that it is leaving the multiconference, it is possible that a battery problem or any other failure prevents it from signaling that it will no longer be involved in the conference, so two situations can arise, one where signaling is allowed and another where said signaling is not allowed owing to a problem or malfunction.

Figure 4:
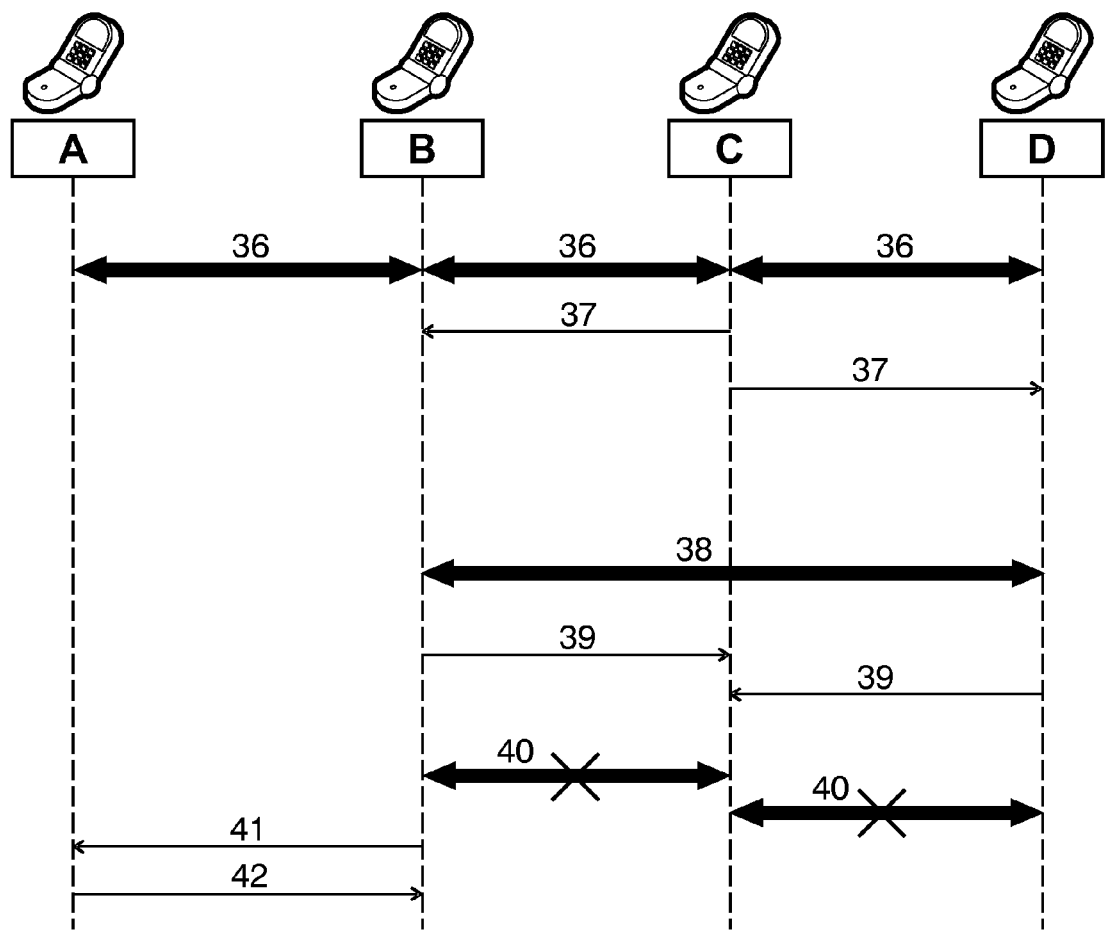
FIG. 4 shows an example of a terminal leaving the conference on impulse of the user by means of sending a petition to break up.

In the case where leaving the conference takes place by means of the indicated signaling, assuming that it is the third terminal leaving the conference, the method of leaving comprises the following steps illustrated with the aid of FIG. 4:

Reference number 36 illustrates the exchange of media streams between the different participating terminals.

The third terminal C issues a petition 37 to break up the conference to the second terminal B and to the fourth terminal D at an instant in time.

The second terminal B and the fourth terminal D reconfigure the conference and exchange the media streams 38.

Once the new session is set up, the petition to break up by the third terminal C is accepted by the neighboring terminals, corresponding to the second terminal B and the fourth terminal D, to do that the latter issue an acceptance 39 of the petition to break up which they send to said third terminal C. Next the transmission and receipt of media streams between the second terminal B and the third terminal C and between the fourth terminal D and the third terminal C is stopped, depicted by means of reference number 40.

Finally, the second terminal B sends a notification 41 including the new media diagram to the remaining terminals participating in the conference which are not involved in the process of leaving, which in this case is the first terminal A, which replies with an acknowledgement of receipt of the notification 42.

Figure 5:
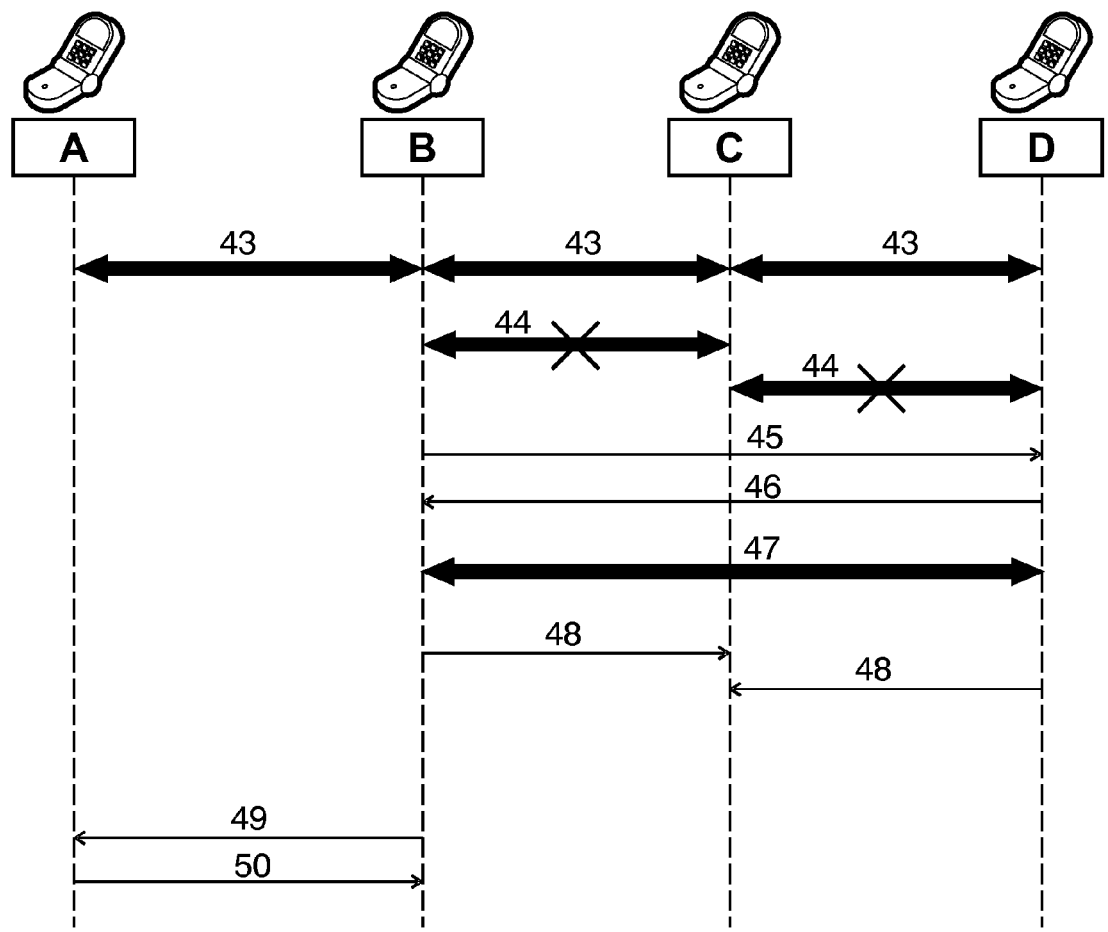
FIG. 5 shows an example of a terminal leaving the multi-conference owing to a malfunction therein.

In the case where leaving the conference is due to the existence of a problem, which determines that the media streams from a specific terminal are not received during a certain time period, the new neighbors reorganize themselves such that the conference can continue without the participant that is experiencing problems, assuming that it is the third terminal leaving the conference, the method is described with the aid of FIG. 5 and comprises the following steps:

Reference number 43 shows the exchange of media streams between the different terminals participating in the multiconference.

At a certain time, the third terminal C ceases to respond to the second terminal B and to the fourth terminal D for a specific time, depicted by means of reference number 44, whereby said second terminal B and fourth terminal D do not receive the media streams from said third terminal C.

One of the terminals, for example in this case the second terminal B, detects the inactivity of one of the streams corresponding to the third terminal C and issues an invitation 45 to the fourth terminal D.

The fourth terminal D receives the invitation 45 and accepts it, generating an acceptance invitation 46 which it sends to the second terminal B.

New media streams 47 are created between the second terminal B and the fourth terminal D according to the streams that they were exchanging with the third terminal C.

Next the second terminal B and the fourth terminal D send a petition 48 to break up the session to the third terminal C.

Given that said third terminal C cannot respond as it has problems, an acceptance to break up is identified in the second terminal B and fourth terminal D when they do not receive a response to the petition to break up within a certain pre-established time.

Finally the terminal that detected the failure of the third terminal C, in this case it was the second terminal B, generates a notification 49 to the remaining terminals participating in the conference of the new distribution of the media streams, which in this case is the first terminal A, this notification includes the new media diagram, such that the multiconference can continue without the third terminal C. Said terminals reply with an acknowledgement of receipt of the notification 50.

The processes described can be combined in a single conference.

The bases of implementing the method of the invention are established on certain mechanism defined by RFC 5368 mixes. This RFC defines the "multiple refer" method whereby a user can ask another user to make petitions to user groups. The encapsulation of user groups and the operation of carrying out the "multiple refer" are done according to RFC 4826.

To describe the participants and media processing diagrams, Extensible Markup Language (XML) documents, which are readily extensible and readable by people, are used. The protocol chosen for communication between participants is the Session Initiation Protocol (SIP), because it allows interoperability with standardized IMS terminals without knowledge of the invention, allowing the terminals to act like leaf terminals in the media processing diagram.

The invention claimed is:

1. A multipoint conference method without using a server, wherein at least a first user terminal, a second user terminal and a third user terminal are involved in the conference, comprising:
storing in the first terminal, second terminal and third terminal a list of the participating terminals, the types of media streams of each terminal, and the media diagram referring to the processing actions of said terminals; media being understood as the data associated with the exchange of audio and video signals between terminals;
the first terminal taking the media streams of the second terminal and its own media stream input provided by said first terminal,
the first terminal generating a mixed audio and video media stream containing the media streams of the first terminal and second terminal, and
sending the media stream generated in the preceding step to the third terminal,
the first terminal taking the media streams of the third terminal and its own media stream input provided by said first terminal,
the first terminal generating a mixed audio and video media stream containing the media streams of the first terminal and third terminal, and
sending the media stream generated in the preceding step to the second terminal, and
wherein a plurality of terminals are involved in the conference, further comprising:
arranging the different terminals in a tree topology,
storing in all the terminals a list of the participating terminals, the types of media streams of each terminal, and the media diagram referring to the processing actions of said terminals,
the first terminal taking the media streams of all the neighboring terminals except that of one of said neighboring terminals, together with its own media stream input,
the first terminal generating a mixed audio and video media stream containing the media streams of the first terminal and of all the neighbors except that of the neighboring terminal from which the media streams were not taken, and
sending the media stream generated in the preceding step to the only neighboring terminal the media streams of which were not taken,
repeating the phases of taking, generating and sending media streams with each group of neighboring terminals forming part of the tree topology so that all the terminals receive the media streams of all the terminals participating in the conference.

2. A multipoint conference method without using a server according to claim 1, further comprising:
- a phase of setting up a conference between a first terminal, a second terminal and a third terminal by means of a direct request from the first terminal to the second terminal, setting up a point-to-point session between both and the subsequent direct request from the second terminal to the third terminal to join the conference; the method further comprising the following steps:
- the first terminal issuing an invitation to the second terminal to set up a conference,
- the second terminal accepting the invitation and sending an invitation acceptance message as a response,
- the second terminal and the first terminal exchanging the media streams included in the conference,
- the second terminal generating an invitation to a third terminal at a certain moment in time to add it as new participant to the communication session, wherein the invitation contains the list of participants, the types of media streams of each terminal, and the media diagram,
- the third terminal replying with an invitation acceptance message if the third user terminal is capable of managing the invitation and the user accepts it,
- the second terminal and third terminal exchanging the media streams involved in the conference such that the second terminal disseminates to the third terminal the media streams resulting from the combination of the media streams transmitted by the first terminal and the media streams provided by the second terminal,
- reconfiguring the media streams by replacing the media streams in the second terminal which are being transmitted to the first terminal by a combination of the media streams provided by the third terminal and the media stream input provided by the second terminal,
- the second terminal sending a notification to the first terminal including the list of participants, the types of media streams of each terminal, and the media diagram,
- the first terminal replying with an acknowledgement of receipt of the notification
- the first terminal detecting the current status of the conference in so that if the second terminal experiences problems to communicate, the third terminal and the first terminal have the information necessary for reconfiguring the conference without the second terminal.

3. A multipoint conference method without using a server according to claim 1, further comprising a phase of setting up a conference between a first terminal, a second terminal and a third terminal by means of a direct request from the first terminal to the second terminal, setting up a point-to-point session between both and subsequently adding a third terminal to the conference by means of an indirect request from a first terminal to a second terminal and the method further comprising the following steps:
- the first terminal issuing an invitation to the second terminal to set up a conference,
- the second terminal accepting the invitation and sending an invitation acceptance message as a response to the first terminal,
- the first terminal and the second terminal exchanging the media streams included in the conference,
- the first terminal requesting the second terminal to add a third terminal to the conference at a certain moment in time,
- the second terminal sending a request acceptance response to the first terminal when it is capable of managing a new session with the third terminal,
- the second terminal issuing an invitation to the third terminal, containing both the list of participants and the media diagram,
- the third terminal replying with an invitation acceptance notification when the new terminal is capable of managing the invitation and its user accepts it,
- the second and the third terminal exchanging the media streams involved in the conference such that the second terminal will disseminate to the third terminal the media streams resulting from the combination of the media transmitted by the first terminal and the media provided by the second terminal itself,
- reconfiguring the media streams by means of the replacement of the media in the second terminal which are being transmitted to the first terminal with a combination of the streams provided by the third terminal and the media stream input provided by the second terminal,
- the second terminal sending a notification to the first terminal including the list of participants, the types of media streams of each terminal, and the media diagram,
- the first terminal replying with an acknowledgement of receipt of the notification,
- the first terminal A detecting the current status of the conference in so that if the second terminal has problems to communicate, the first and the third terminal have the information necessary for reconfiguring the conference without the second terminal.

4. A multipoint conference method without using a server according to claim 2, further comprising a phase wherein at a certain moment in time a third terminal participating in a conference adds a fourth additional terminal to the conference, and the method further comprising the following steps:
- the third terminal issuing an invitation to a fourth additional terminal including the list of participants, the types of media streams of each terminal, and the media diagram,
- the fourth additional terminal accepting the invitation and sending an invitation acceptance message as a response to the third terminal,
- the fourth additional terminal sending its media streams to the third terminal, in which they are received, and
- said third terminal combining the media streams received from the fourth additional terminal with its own media stream input and forwarding them to the second terminal;
- said second terminal sending the combined streams to the first terminal and to the remaining neighboring terminals,
- the third terminal combining the media streams received from the second terminal with its own media stream input and forwarding them to the fourth additional terminal,
- the third terminal, as the terminal responsible for involving the fourth additional terminal, informing the remaining terminals participating in the conference of the reconfiguration experienced by the conference, sending the list of participants, the types of media streams of each terminal, and the media diagram
- said remaining terminals responding to the third terminal with an acknowledgement of receipt of the notification.

5. A multipoint conference method without using a server according to claim 2, further comprising a phase wherein at a certain moment in time the first terminal adds a fourth additional terminal to the conference by means of an indirect request to a third terminal, and the method further comprising the following steps:

the first terminal requesting the third terminal to add a fourth additional terminal to the conference at a certain moment in time, the third terminal sending a request acceptance response to the first terminal when said third terminal is capable of managing a new session with the fourth additional terminal, the third terminal issuing an invitation to the new terminal, including the list of participants and the media diagram, the fourth additional terminal replying with an invitation acceptance notification when it is capable of managing the invitation and its user accepts it, the fourth additional terminal sending its media streams to the third terminal in which they are received, and said third terminal combining the media streams received from the fourth additional terminal with its own media stream input and forwarding them to the second terminal;

said second terminal sending the combined streams to the first terminal and to the remaining neighboring terminals, the third terminal combining the media streams received from the second terminal with its own media stream input and forwarding them to the fourth additional terminal, the third terminal, as the terminal responsible for involving the fourth additional terminal, informing the remaining terminals participating in the conference of the reconfiguration experienced by the conference, sending the list of participants, the types of media streams of each terminal, and the media diagram, said remaining terminals responding to the third terminal with an acknowledgement of receipt of the notification.

6. A multipoint conference method without using a server according to claim 1, wherein when a third terminal leaves the conference the method comprises the following steps:

the third terminal issuing a petition to break up the conference to a second terminal and to the fourth additional terminal, the second terminal and fourth additional terminal reconfiguring the conference, said second terminal and fourth additional terminal exchanging the media streams of the conference, the second terminal and fourth additional terminal sending an acceptance of the petition to break up to the third terminal which leaves the conference, stopping the transmission and receipt of media streams between the second terminal and the third terminal and between the fourth additional terminal and the third terminal, the second terminal and fourth additional terminal sending a notification to the remaining terminals participating in the conference that are not involved in the process of leaving including the new media diagram, said remaining terminals replying with an acknowledgement of receipt of the notification to the terminal issuing same.

7. A multipoint conference method without using a server according to claim 1, wherein when a third terminal leaves the conference the method comprises the following steps:

the third terminal ceasing to respond to the second terminal and to the fourth additional terminal for a specific time, whereby said terminals do not receive the media streams from said third terminal, a terminal, selected from the second terminal and the fourth additional terminal, detecting the inactivity in one of the streams, and issuing an invitation to the other terminal affected by the failure, selected from the fourth additional terminal and the second terminal, depending on the terminal that detected the inactivity in one of the streams, the other terminal, selected from the fourth additional terminal and second terminal, receiving the invitation and the terminal receiving it accepting the invitation, creating new media streams between the second terminal and fourth additional terminal according to the streams that they were exchanging with the third terminal, the second terminal and fourth additional terminal sending a petition to break up the conference to the third terminal, when they do not receive a response to the petition to break up within a certain pre-established time, the second terminal and fourth additional terminal identifying it as an acceptance to break up, the terminal issuing the invitation, selected from the second terminal and the fourth additional terminal, notifying the remaining terminals participating in the conference of the new distribution of the media streams by sending a notification including the new media diagram, said remaining terminals replying with an acknowledgement of receipt of the notification to the terminal issuing same.

8. A multipoint conference method without using a server according to claim 1, wherein the steps in which the list of participants, the types of media streams of each terminal, and the media diagram are sent are carried out by means of sending, selected from sending enclosed data and sending a reference to the enclosed data.

* * * * *